United States Patent [19]

Williams et al.

[11] Patent Number: 5,064,225

[45] Date of Patent: * Nov. 12, 1991

[54] COUPLING DEVICE AND METHOD FOR TUBULAR ELEMENTS

[75] Inventors: Anthony D. Williams, 1929 Washington St., San Carlos, Calif. 94070; Adam Nye, Los Altos, Calif.

[73] Assignee: Anthony D. Williams, San Carlos, Calif.

[*] Notice: The portion of the term of this patent subsequent to Apr. 11, 2006 has been disclaimed.

[21] Appl. No.: 336,671

[22] Filed: Apr. 11, 1989

Related U.S. Application Data

[63] Continuation-in-part of Ser. No. 179,062, Apr. 8, 1988, Pat. No. 4,819,969.

[51] Int. Cl.$^5$ .............................................. F16L 25/00
[52] U.S. Cl. .................................... 285/177; 285/332; 285/332.4; 285/399; 29/525; 403/368
[58] Field of Search ................... 285/382, 334.4, 334.2, 285/399, 334.1, 421, 177, 215, 382.1, 382.2, 382.7; 29/506, 520, 525; 403/368, 374, 314, 409

[56] References Cited

U.S. PATENT DOCUMENTS

| 116,098 | 6/1871 | Reynolds | 285/382 X |
|---|---|---|---|
| 2,345,750 | 4/1944 | Hohwart | 403/368 |
| 2,374,284 | 4/1945 | Hall | 285/399 X |
| 3,058,777 | 10/1962 | Froedge | 29/525 |
| 3,269,743 | 8/1966 | Barreca | 29/525 |
| 3,471,181 | 10/1969 | Fuentes | 285/382.7 |
| 3,567,257 | 3/1971 | Nowosadko | 285/334.4 X |
| 3,797,835 | 3/1974 | Wehner | 265/334.4 X |
| 4,648,632 | 3/1987 | Hayner | 285/334.4 X |
| 4,819,969 | 4/1989 | Williams | 265/177 |

Primary Examiner—Dave W. Arola
Attorney, Agent, or Firm—Flehr, Hohbach, Test, Albritton & Herbert

[57] ABSTRACT

Coupling device and method for joining together tubular elements such as sections of aluminum tubing. The device comprises a coupling sleeve having conically tapered walls of diameters corresponding to the diameters of the tubular elements to be joined together. The tubular elements and the sleeve are pressed together to form a rigid structure in which the tubular elements are aligned axially of each other and the walls of the coupling sleeve are in tight frictional engagement with the walls of the tubular elements.

15 Claims, 3 Drawing Sheets

Fig. 3

| ELEMENT SIZES OD X ID | SMALL END OD X ID | BIG END OD X ID | LENGTH | OUTER WALL ANGLE | INNER WALL ANGLE |
|---|---|---|---|---|---|
| 3.00 x 2.75<br>1.66 x 1.25 | 2.740 x 1.6512 | 2.7669 x 1.663 | 5.375 | .2867° | .1258° |
| 1.66 x 1.25<br>0.75 x 0.584 | 1.374 x .7408 | 1.3903 x .749 | 2.50 | .3750° | .1875° |
| 0.75 x 0.584<br>0.50 x 0.334 | .578 x .4876 | .6028 x .500 | 1.875 | .7586° | .3794° |
| 2.25 x 1.874<br>1.66 x 1.25 | 1.749 x 1.6442 | 2.7669 x 1.663 | 5.375 | .2867° | .1258° |
| 1.05 x 0.850<br>0.75 x 0.584 | .824 x .7325 | .8570 x .749 | 2.50 | .7586° | .3794° |
| 1.05 x 0.850<br>0.50 x 0.334 | .824 x .4939 | .8364 x .500 | 1.875 | .3794° | .1875° |

COUPLING DEVICE AND METHOD FOR TUBULAR ELEMENTS

This is a continuation-in-part of Ser. No. 179,062, filed Apr. 8, 1988, now U.S. No. 4,819,969, issued Apr. 11, 1989.

This invention pertains generally to the coupling of tubular elements, and more particularly to a coupling device and method for joining sections of aluminum tubing together to form the elements of an antenna.

Yagi antennas are employed in radio communications and other situations where signal gain and directivity are desired. Such antennas have a plurality of elongated elements mounted on a longitudinally extending boom, with the elements extending in a lateral direction and being spaced along the boom. For transmitting, at least one of the elements is driven with the signal to be propagated, and the remaining elements serve as directors or reflectors for this signal. For receiving, the received signal is taken from the element(s) which would be driven for transmission.

The lengths of the elements are dependent upon the frequency at which the antenna is designed to operate and the function of the elements. The length of a driven element is generally inversely proportional to the operating frequency of the antenna, a reflector is generally longer than a driven element, and directors are generally shorter than a driven element.

The elements of a Yagi antenna are commonly formed of a relatively lightweight electrically conductive material such as aluminum tubing, with the longer elements comprising a plurality of sections of progressively smaller tubing joined telescopically together. With this construction, it is important that the joints between the sections be strong from a mechanical standpoint and that they provide good electrical conductivity between the sections.

In smaller antennas, the joints between the tubular sections are commonly made by clamping overlapping end portions of the sections together, sometimes with a split in the larger section to permit it to be drawn more tightly against the smaller section. While this technique has been used successively at higher frequencies where the overall lengths of the elements are shorter, it is not satisfactory at lower frequencies where the element lengths may be on the order of 65 feet or more.

Prior to making the present invention, applicant tried a number of techniques for joining aluminum tubing together to make the elements of an antenna. These tests included welding, swedged joints, an electrically conductive adhesive, tapering the end portion of the smaller tubing to provide a tight fit, and bolting the sections together. Elements constructed in accordance with each of these techniques failed in a relatively short time, either because the joints separated or because the tubing broke near the joints.

It is in general an object of the invention to provide a new and improved device and method for joining tubular elements together.

Another object of the invention is to provide a device and method of the above character which overcome the limitations and disadvantages of techniques heretofore employed for joining aluminum tubing together.

Another object of the invention is to provide a device and method of the above character which are particularly suitable for use in the construction of the elongated elements of a Yagi antenna.

These and other objects are achieved in accordance with the invention by providing a coupling sleeve having tapered walls with cross sectional dimensions corresponding to the cross sectional dimensions of the tubular elements to be joined together, and pressing the tubular elements and the sleeve together to form a rigid structure in which the tubular elements are aligned axially of each other and the tapered walls of the coupling sleeve are in tight frictional engagement with the walls of the tubular elements.

FIG. 3 is a table of dimensions for coupling sleeves for use with tubular sections for different sizes in the antenna of FIG. 1.

Figure 1:
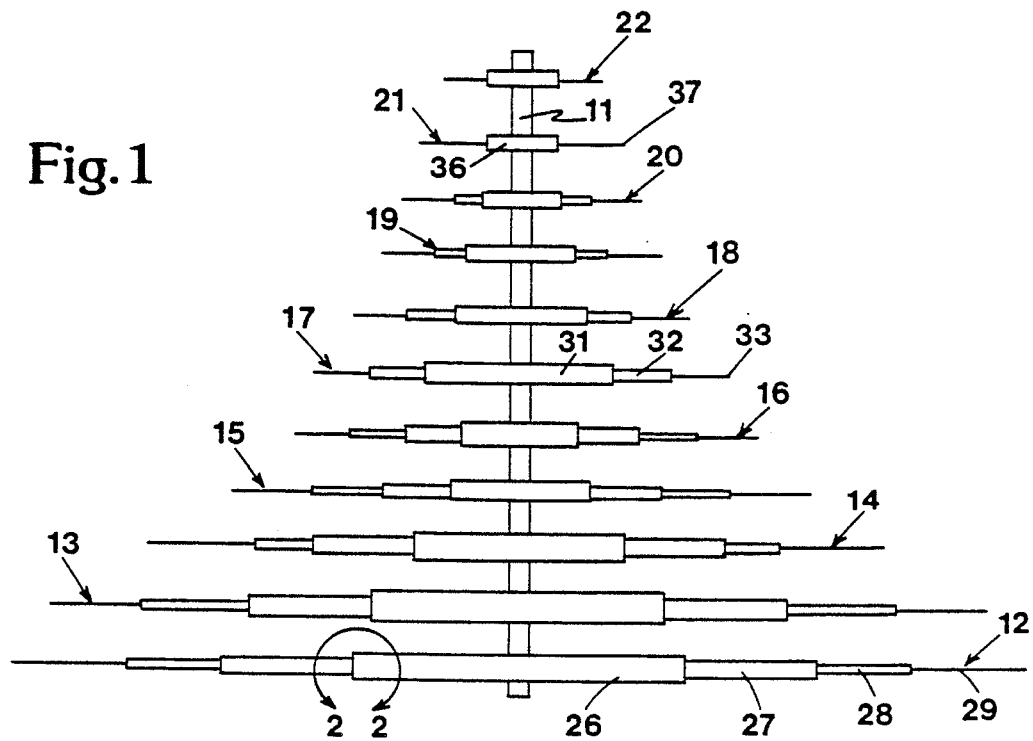
FIG. 1 is a top plan view of one embodiment of an antenna with coupling sleeves according to the invention.

The antenna illustrated in FIG. 1 is a Yagi antenna which has a longitudinally extending boom 11 on which a plurality of elongated elements 12-22 are mounted. The elements extend laterally or crosswise of the boom and are affixed to the boom at their midpoints by suitable means such as clamps, not shown. In the particular antenna which is illustrated, element 12 is a reflector, element 13 is a driven element, and elements 14-22 are directors. As is customary in Yagi antennas, the reflector element is slightly longer than the driven element, and the directors elements decrease in length toward the front of the antenna.

The lengths of the elements are determined by the frequency at which the antenna is to be operated and the gain and directivity characteristics desired. In one embodiment intended for use relatively low frequencies, the driven element has a length on the order of 63.5 feet, the reflector has a length on the order of 64.25 feet, and the directors have lengths ranging from about 53 feet to about 9.25 feet.

Each of the elements is fabricated of a plurality of sections of aluminum tubing, with the number of sections and the size of the tubing in each element depending upon the length of the element. Reflector element 12, for example, has seven sections of tubing, including a central section 26, with two intermediate sections 27, 28 and an outer section 29 on each side of the central section. The central section has an outer diameter on the order of 3.00 inches, an inner diameter on the order of 2.75 inches, and a length on the order of 144 inches. Intermediate sections 27 each have an outer diameter on the order of 1.66 inch, an inner diameter of 1.25 inch, and a length on the order of 138 inches. Intermediate sections 28 each have an outer diameter of 0.75 inch, and inner diameter of 0.584 inch, and a length on the order of 54 inches. End sections 29 each have an outer diameter of 0.50 inch, an inner diameter of 0.334 inch, and a length on the order of 64 inches.

Driven element 13 and directors 14–16 each have seven sections and are similar in construction to reflector element 12. However, since the director elements are shorter and lighter than the reflector, the central sections of these elements can be shorter and smaller in diameter than the central sections of the longer elements. Thus, in the embodiment illustrated, the central sections of elements 14–16 have an outer diameter of 2.25 inches, an inner diameter of 1.874 inch, and lengths ranging from about 71 inches to about 36 inches. The shortest of these three elements (element 16), for example, has an overall length on the order of 34.5 feet.

Director elements 17–20 each have five sections of tubing. Element 17, for example has a central section 31, with an intermediate section 32 and an outer section 33 on each side of the central section. The central section has an outer diameter of 1.05 inch, an inner diameter of 0.85 inch, and a length on the order of 62 inches. Intermediate sections 32 are similar in diameter to intermediate sections 28, and sections 32 each have a length on the order of 58 inches. End sections 33 are similar in diameter to end sections 29, and end sections 33 each have a length on the order of 64 inches. Elements 18–20 are of progressively shorter length, and element 20 has an overall length on the order of 8.75 feet.

The two shortest director elements (elements 21 and 22) each have three sections of tubing. Element 21, for example, has a central section 36 and end sections 37. Central section 36 is similar in diameter to central section 31, and end sections 37 are similar in diameter to end sections 29 and 33. Director 22 has an overall length on the order of 7.58 feet.

The sections of tubing which make up each of the elements of the antenna are aligned coaxially of each other, with the adjoining end portions of the sections overlapping each other in telescopic fashion. The sections are secured together by coupling sleeves 39 which are press fit with the overlapping end portions of the tubular sections to provide joints which are both mechanically strong and electrically conductive.

Figure 2:
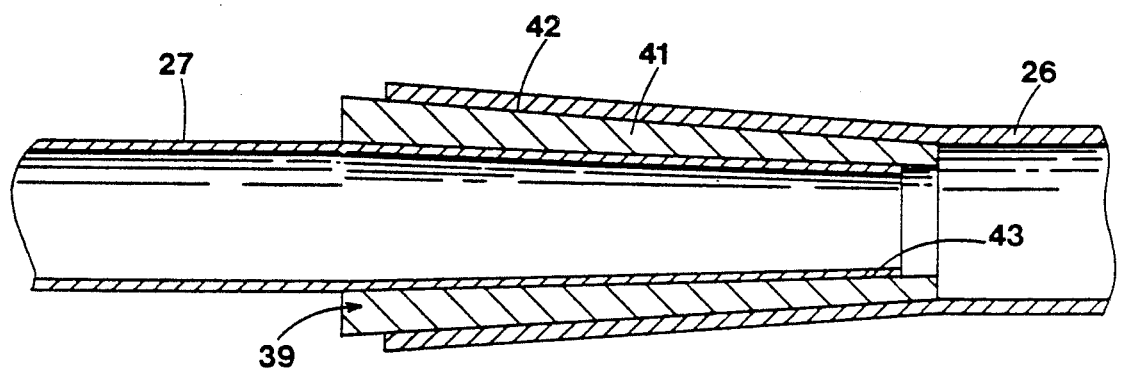
FIG. 2 is an enlarged centerline sectional view of one of the coupling sleeves in the embodiment of FIG. 1.

As illustrated in FIG. 2, each of the coupling sleeves 39 has an axially elongated body 41, with a conically tapered outer wall 42 and a conically tapered inner wall 43 disposed concentrically of each other. The diameter and the angle of taper of outer wall 42 are selected to provide a press fit with the inner wall of the larger tubular section to be joined by the sleeve, and the diameter and the angle of taper of inner wall 43 are selected to provide a press fit with the outer wall of the smaller section of tubing to be joined by the sleeve.

The particular coupling sleeve in shown in FIG. 2 is the one which joins the central section 26 and intermediate section 27 of reflector element 12 together. The dimensions for this sleeve are given in the first line of the table in FIG. 3. Central section 26 has an inner diameter of 2.75 inches, and the coupling sleeve has an outer diameter of 2.74 inches at its small end and an outer diameter of 2.7669 inches at its large end. When the sleeve is pressed into the tubular section, the end portion of the tube is expanded or flared slightly by the sleeve.

Tubing section 27 has an outer diameter of 1.66 inch, and the coupling sleeve has an inner diameter of 1.663 inch at its big end and 1.6512 inch at its small end. When the sleeve is pressed onto the end portion of tubular section 27, the end portion is compressed or tapered slightly.

The coupling sleeve which joins central section 26 and intermediate section 27 together has a length on the order of 5.375 inches, and the sleeve projects about 0.25 inch from the ends of the tubular sections.

It has been found that the best results are obtained when the outer wall of the coupling sleeve has a greater angle of taper than the inner wall of the sleeve. More specifically, it has been found that the angle of taper of the outer wall should be on the order of two times the angle of taper of the inner wall. Thus, for example, in the coupling sleeve which joins central section 26 and intermediate section 27 together, the outer wall has an angle of taper of 0.2867°, and the inner wall has an angle of taper of 0.1258°.

It is also desirable that the coupling sleeve have a sufficient wall thickness to prevent deformation of the sleeve when it is pressed into and onto the elements to be joined together. Thus, for example, the sleeve which joins tubular sections 26 and 27 together has an average wall thickness on the order of 0.545 inch, whereas the tubular sections have a wall thicknesses of 0.125 and 0.205 inch, respectively. The sleeve can be fabricated of the same material as the tubing, e.g. aluminum, or any other suitable material.

The dimensions of the coupling sleeves which join the other sections of tubing together in the antenna of FIG. 1 are given in the table of FIG. 3. All of the dimensions are in units of inches, except the angles which are in degrees.

As noted above, the coupling sleeves and the tubular sections are joined together by press fitting. This is conveniently done by pressing the sleeve into position on the smaller tubing section first, then pressing the sleeve into position within the larger section. This method of assembly has the advantage that the sleeve can be engaged directly by the press at al times, which means that the sleeve can be positioned as desired on the smaller tubular section and the pressed to the desired position within the larger section without disturbing the position of the sleeve on the smaller sections. Any other suitable method of assembly can, of course, be employed.

Figure 4:
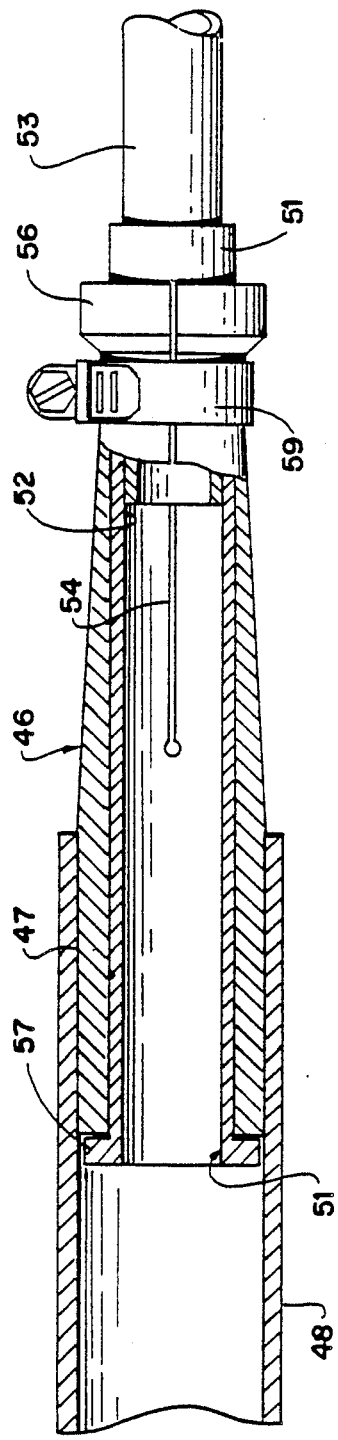
FIG. 4 is a fragmentary side elevational view, partly broken away, of an antenna element with another embodiment of a coupling device according to the invention.

In the embodiment of FIG 4, the coupling device includes an outer sleeve 46 having a conically tapered outer wall 47 which is press fit to the inner wall of a tubular element 48, and an inner sleeve 51 having a conically tapered inner wall 52 which is press fit to the outer wall of a tubular element 53. The tapers of these walls are similar to the tapers of the embodiment of FIG. 2 in that outer wall 47 has an angle of taper which is about twice the angle of taper of inner wall 52. In one presently preferred embodiment, wall 47 has an angle of taper no greater than about 0.25°, and wall 52 has a taper no greater than about 0.125°.

A portion of sleeve 46 extends beyond the outer end of tubular element 48 and is split so that it can be clamped or compressed about inner sleeve 51. This portion has a plurality of longitudinally extending slots 54 which extend about one-half the length of the sleeve. In the embodiment illustrated, four such slots are provided, and they are spaced in quadrature about the circumference of the sleeve. The outer end portion 56 of the sleeve is enlarged to add rigidity to the structure and to serve as a retainer for a clamp which secures the assembly together.

Inner sleeve 51 extends axially from the inner end of element 53, and the free end of this sleeve has a laterally projecting annular flange 57. This flange has an outer diameter greater than the inner diameter of sleeve 46 and less than the outer diameter of this sleeve so that it can pass through tubular element 48 and abut against the inner end of sleeve 46.

A band clamp 59 encircles the split end portion of outer sleeve 46 and, when tightened, secures the sleeves together as a rigid structure.

In use, sleeves 46 and 51 are affixed to tubular elements 48 and 53, and element 51 and sleeve 51 are passed through element 48 until flange 57 abuts against the inner end of sleeve 46. Clamp 59 is then tightened to secure the elements together.

This embodiment has all of the advantages of press fit connections in the embodiment of FIG. 2, including rigidity and good electrical conductivity between the sections of tubing which make up each of the antenna elements. In addition, it permits the antenna to be employed as a portable structure which can be readily assembled and disassembled in the field without special equipment for making the press fit connections.

Figure 5:
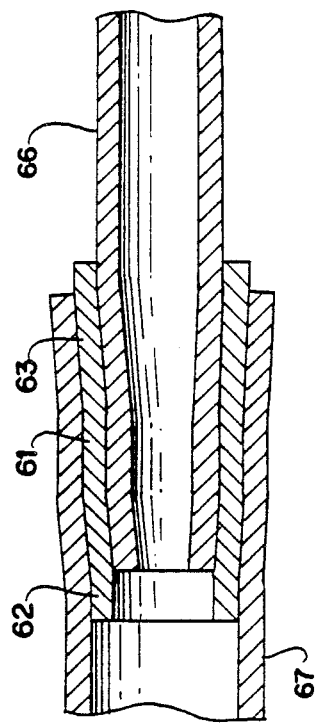
FIGS. 5-6 are fragmentary centerline sectional views of antenna elements with additional embodiments of coupling devices embodying the invention.

In the embodiment of FIG. 5, the coupling sleeve has a central section 61 and a pair of end sections 62, 63 which can have similar or different angles of taper. In the embodiment illustrated, the inner and outer walls in the end sections have similar angles of taper, and the central section is straight. With this embodiment, the angles of taper can be steeper than in the embodiments of FIGS. 2 and 3, and angles on the order of up to about 15° can be employed.

The embodiment of FIG. 5 is illustrated in connection with tubular elements 66, 67. The sleeve is press fit over the end portion of element 66, with the inner wall of all three sections of the sleeve in engagement with the outer wall of the element. The sleeve is likewise press fit within element 67, with the outer wall of all three sections of the sleeve in engagement with the inner wall of the element.

Figure 6:
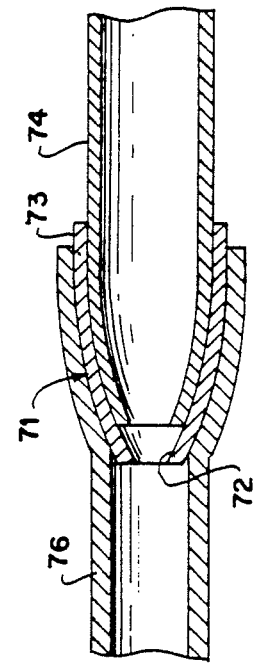

The embodiment of FIG. 6 comprises a coupling sleeve 71 having an inner wall 72 and an outer wall 73 which are tapered in a nonlinear manner. Inner wall 72 is press fit to the outer wall of a tubular element 74, and outer wall 73 is press fit to the inner wall of a tubular element 76. In one presently preferred embodiment the curvature of walls 72 and 73 is exponential, but it can be of any other suitable nonlinear or curved configuration.

The coupling sleeve and method of the invention have a number of important features and advantages. They provide a secure joint which is both mechanically sound and electrically conductive. The joints are long-lasting and free of the failures which have been encountered with the techniques previously employed for joining antenna sections together. While the sleeve has been disclosed with specific reference to aluminum tubing of circular cross section, it can be employed with other materials and types of tubing (e.g., box tubing) as well.

It is apparent from the foregoing that a new and improved coupling device and method for joining tubular elements together have been provided. While only certain presently preferred embodiments have been described in detail, as will be apparent to those familiar with the art, certain changes and modifications can be made without departing from the scope of the invention as defined by the following claims.

We claim:

1. In a device for joining together first and second tubular elements: an axially elongated outer sleeve having a tapered portion toward one end thereof for press fit engagement with the inner wall of the first tubular element and a longitudinally split portion toward the other end thereof, an inner sleeve having a tapered portion toward one end thereof for press fit engagement with the outer wall of the second tubular element and a laterally projecting flange toward the other end thereof, said inner sleeve being adapted to be slidably received within said outer sleeve with the laterally projecting flange abutting against the tapered end of the outer sleeve to limit relative movement of the sleeves in one direction, and means engagable with the split portion of the outer sleeve for clamping the two sleeves together.

2. The device of claim 1 wherein the tapered portion of the outer sleeve has an angle of taper less than about 0.80°.

3. The device of claim 1 wherein the tapered portion of the outer sleeve has an angle of taper on the order of twice the angle of taper of the inner sleeve.

4. The device of claim 1 wherein the means for clamping the two sleeves together comprises a band clamp.

5. In combination: first and second axially aligned tubular elements, a sleeve having a tapered inner wall in press fit engagement with the outer wall of the first tubular element and a tapered outer wall in press fit engagement with the inner wall of the second tubular element, the tubular elements and the sleeve being held together as a rigid structure by the press fit engagement between the walls of the tubular elements and the sleeve.

6. In combination: first and second axially aligned tubular elements, a sleeve having a tapered inner wall in press fit engagement with the outer wall of the first tubular element and a tapered outer wall having an angle of taper of no more than about 0.80° in press fit engagement with the inner wall of the second tubular element.

7. In combination: first and second axially aligned tubular elements, a sleeve having a tapered inner wall in press fit engagement with the outer wall of the first tubular element and a tapered outer wall having an angle of taper on the order of two times the angle of taper of the inner wall in press fit engagement with the inner wall of the second tubular element.

8. In a device for joining together first and second tubular elements: a sleeve having an inner wall for press fit engagement with the outer wall of the first tubular element and an outer wall for press fit engagement with the inner wall of the second tubular element, said inner and outer walls each having a pair of tapered end sections and a central section between the end sections, adjacent ones of said sections having different angles of taper and the tubular elements and the sleeve being held together as a rigid structure by the press fit engagement between the walls of the tubular elements and the sleeve.

9. In a method of joining first and second tubular elements together, the steps of: press fitting an outer coupling sleeve having a split end portion to the first tubular element with the split end portion extending in an axial direction from the first tubular element, press fitting an inner coupling sleeve to the second tubular element, positioning the inner coupling sleeve within the outer coupling sleeve, and clamping the split end portion of the outer coupling sleeve to the inner coupling sleeve to secure the tubular elements together.

10. The method of claim 9 wherein the coupling sleeves are press fit to the tubular elements before the inner sleeve is positioned within the outer sleeve.

11. In a method of joining first and second tubular elements together, the steps of: aligning the tubular elements axially with each other and with a coupling sleeve having tapered walls, and pressing the tubular elements and the sleeve together with an axially directed force sufficient to form a rigid structure in which the tapered walls of the coupling sleeve are in tight press fit engagement with the walls of the tubular elements and the press fit engagement holds the tubular elements and the sleeve securely together.

12. In a method of joining first and second tubular elements together, the steps of: press fitting an outer coupling sleeve having a split end portion to the first tubular element with the split end portion extending in an axial direction from the first tubular element, press fitting an inner coupling sleeve having a stop to the second tubular element, passing the second tubular element in the inner coupling sleeve axially through the first tubular element until the stop on the inner coupling sleeve engages the outer coupling sleeve, and clamping the split end portion of the outer coupling sleeve to the inner coupling sleeve to secure the tubular elements together.

13. In combination: first and second axially aligned tubular elements, a sleeve having an inner wall tapered in a nonlinear manner in press fit engagement with the outer wall of the first tubular element and an outer wall tapered in a nonlinear manner in press fit engagement with the inner wall of the second tubular element, the tubular elements and the sleeve being held together as a rigid structure by the press fit engagement between the walls of the tubular elements and the sleeve.

14. In a device for joining together first and second tubular elements: a sleeve having an inner wall for press fit engagement with the outer wall of the first tubular element and an outer wall for press fit engagement with the inner wall of the second tubular element, said inner and outer walls each having a pair of tapered end sections and a cylindrical central section between the end sections, adjacent ones of said sections having different angles of taper and the tubular elements and the sleeve being held together as a rigid structure by the press fit engagement between the walls of the tubular elements and the sleeve.

15. In a device for joining together first and second tubular elements; a sleeve having an inner wall for press fit engagement with the outer wall of the first tubular element and an outer wall for press fit engagement with the inner wall of the second tubular element, said inner and outer walls each having a pair of tapered end sections having angles of taper of no more than about 15 degrees and a cylindrical central section between the end sections, adjacent ones of said sections having different angles of taper and the tubular elements and the sleeve being held together as a rigid structure by the press fit engagement between the walls of the tubular elements and the sleeve.

* * * * *